Dec. 3, 1957  P. BARTLETT  2,815,396
ELECTRIC BUS DUCT APPARATUS
Filed July 22, 1955
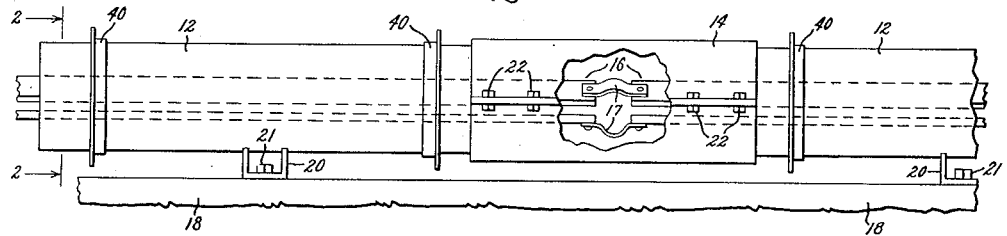
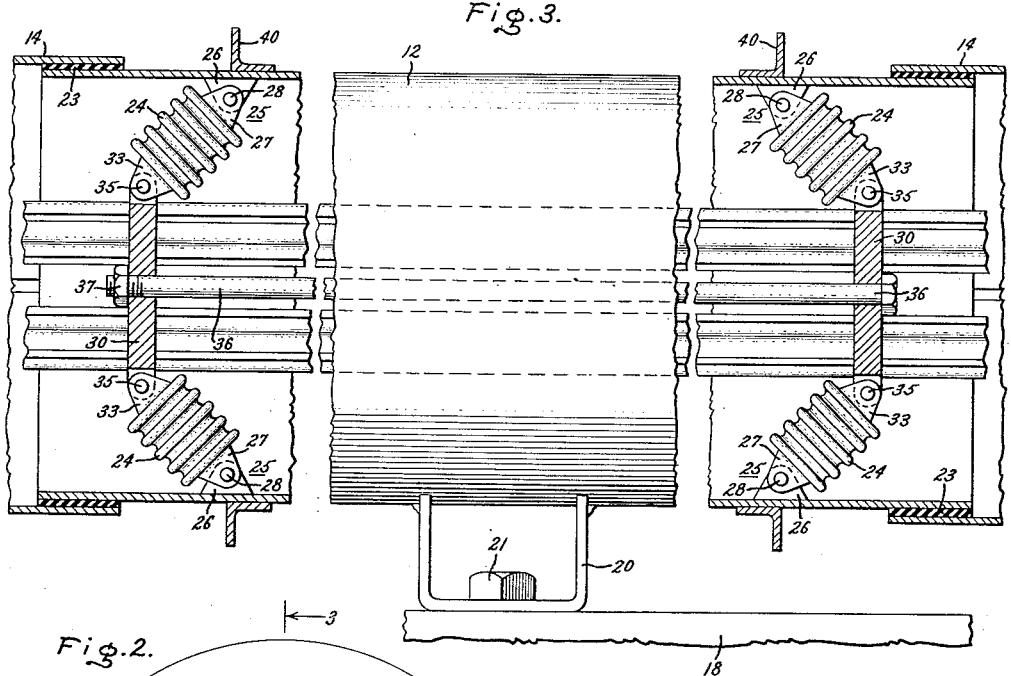
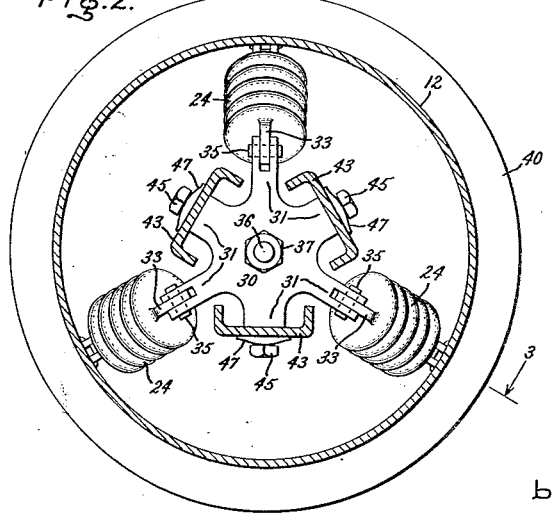
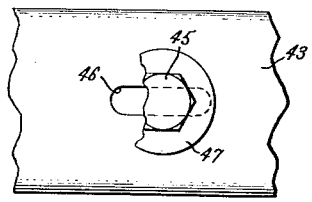
Inventor:
Percy Bartlett,
by J. Wesley Haubner
His Attorney.

United States Patent Office 2,815,396
Patented Dec. 3, 1957

2,815,396

ELECTRIC BUS DUCT APPARATUS

Percy Bartlett, Swarthmore, Pa., assignor to General Electric Company, a corporation of New York Application July 22, 1955, Serial No. 523,849

6 Claims. (Cl. 174—99)

This invention relates to electric bus duct apparatus of the enclosed, isolated bus type.

More particularly, it relates to the type of bus duct apparatus wherein the bus is supported by insulators which are preloaded in compression for the purposes of minimizing the likelihood that the insulators will be subjected to tensile or cantilever forces.

Prior arrangements for accomplishing this preloading have been relatively complex, have contained a large number of parts which require adjustment in order to achieve the desired preloading, and have not lent themselves readily to equal precompression of the insulators.

Accordingly, it is an object of my invention to provide a structurally-simple bus mounting arrangement in which all of the insulators supporting a particular bus section can be readily preloaded in substantially equal compression.

Another object of my invention is to provide a bus mounting arrangement which can be quickly and economically assembled as a self-sustained unit with its insulators placed in compression independently of the bus itself. This permits the precompression operation to be carried out without reliance upon or interference from the bus structure, which can be incorporated into the assembly at any convenient time thereafter.

Another object is to utilize the usual thin-walled metallic duct which encloses the bus as an integral part of the bus mounting arrangement and as a means for imparting resilience to the bus mounting arrangement. This resilience permits a limited shifting of the bus relative to the duct, to adjacent buses, and to the stationary foundation. It also provides a cushioning action which minimizes the danger that the insulators will be subjected to abruptly-applied mechanical shocks, as from short-circuit-produced electromagnetic forces.

In accordance with a preferred form of my invention, I provide electric bus duct apparatus comprising a tubular elongated duct section and a pair of groups of bus-supporting insulators located at axially-spaced stations within the duct section. Each of the insulators is pivotally mounted on the duct section with the insulators of each group disposed in angularly-spaced, generally radially-extending relationship. Pivotally connected to the radially inner ends of the insulators of each group and holding the insulators of each group in axially-converging relationship are two centrally located frames, one for each group. These frames are located in axially-spaced relationship with the insulators of one group converging in an axially-opposite direction to the insulators of the other group. Stated, otherwise, the insulators of each group are inclined with respect to a median plane perpendicular to the duct axis and form oppositely-convex assemblies on opposite sides of such median plane. An adjustable length tension rod extending between the frames is provided for forcing the frames together to precompress the insulators. An elongated conductive bus extending between the frames is suitably supported thereon.

In accordance with another feature of my invention the duct section is provided with thin resilient walls and these are utilized as a means for imparting resilience to the bus mounting arrangement. This is achieved by supporting the duct section on its stationary foundation over only a minor portion of its length and by locating the bus-supporting insulators at axially-spaced stations which are widely offset from the location of the duct supporting means.

For a better understanding of my invention, reference may be had to the following specification taken in connection with the accompanying sheet of drawings, wherein: Fig. 1 is a fragmentary side elevational view, partly in section, showing bus duct apparatus embodying my invention; Fig. 2 is an enlarged sectional view taken along the line 2—2 of Fig. 1; Fig. 3 is another sectional view taken along the line 3—3 of Fig. 2; and Fig. 4 is an enlarged detail view of a portion of the bus duct apparatus.

Referring now to the drawing, Fig. 1 shows a representative portion of a single phase bus run. The illustrated portion of the bus run comprises a plurality of spaced-apart coaxially-disposed main duct sections 12, which are connected together in end-to-end relationship by an intermediate duct section 14. These interconnected duct sections, which are preferably of aluminum, form an enclosure for a conductive bus 16 which extends axially therethrough. This bus 16 is divided into axially-spaced sections which are electrically interconnected by suitable flexible jumpers 17.

Each of the main duct sections 12 is supported upon a stationary foundation 18, preferably by means of a U-shaped bracket 20 located approximately midway between the ends of the duct section and extending over only a minor portion of the length of the duct section. Each of these brackets 20 is welded to the lower side of the duct section and is bolted to the foundation 18, as by bolts 21. Each of the intermediate duct sections 14 is longitudinally split into upper and lower segments which are clamped together about the spaced-apart free ends of the main duct sections 12 by means of suitable bolts 22. As shown in Fig. 3, a suitable annular gasket 23 is interposed between the mating surfaces of the main and intermediate duct sections to provide a seal therebetween.

For supporting the bus 16 within the duct structure, I provide at axially-spaced stations within each of the main duct sections 12 a pair of groups of insulators 24, preferably of porcelain. As shown in Figs. 2 and 3, each of these insulators 24 is of the pillar type and is pivotally supported at its radially outer end by means of a suitable pivot joint 25. Each of these pivot joints comprises a clevis 26 welded to the inner periphery of the duct section and a tongue 27 suitably secured to the insulator 24 and fitting freely within the clevis. The tongue and clevis are provided with suitable registering apertures receiving a pivot pin 28, which is suitably anchored within the clevis.

As shown in Figs. 2 and 3, the insulators 24 of each group are disposed in angularly-spaced, generally radially-extending relationship. The radially inner ends of the insulators of each group are pivotally joined to a centrally-located frame, or spider, 30 which holds the insulators of each group in axially-converging relationship. This spider 30 has a hub portion and a plurality of arms 31 projecting radially therefrom. Alternate arms are slotted at their outer ends to form clevis portions which receive tongues 33 suitably secured to the insulators 24. These tongues 33 have openings which loosely receive pivot pins 35 anchored in the clevis portions. It will be apparent from Fig. 2 that the spiders 30 are so arranged that the insulators 24 of one group converge in a direction axially-opposite to the insulators of the other group. Stated otherwise, the insulators of each group are inclined with respect to a median plane perpendicular to the duct axis to form generally convex assemblies facing oppositely from such median plane.

For preloading all of the insulators of the two groups in substantially equal compression, I provide a centrally-located tension rod 36 which extends axially between the spiders or frames 30. This tension rod 36 is provided with threads receiving a suitable nut 37 which can be tightened to force the spiders 30 together. This action preloads the insulators 24 in compression and thereby minimizes the likelihood that the insulators will be subjected to tensile or cantilever forces thereafter. Since the spiders 30 are forced toward each other by forces of equal magnitude, it will be apparent that all of the insulators will be subjected to substantially equal compressive forces. Thus, it should be apparent that a single, simple adjustment is all that is needed, in order to preload the insulators substantially equally in compression.

Preferably, an annular reinforcing ring 40 fitting tightly about the outer periphery of the duct section is provided at each insulator station for receiving the compressive forces transmitted through the insulators. This reinforcing ring imparts a moderate degree of rigidity to the duct section in this particular region but insufficient rigidity to preclude a slight amount of distortion of the walls of the duct in response to an insulator preloading operation. Similarly, the degree of rigidity is insufficient to preclude a slight additional amount of distortion of the duct section in response to the electromagnetic forces produced by short circuits and the like. This relationship will be pointed out in more detail hereinafter.

After the insulators have been properly preloaded in the above-described manner, the bus itself can be quickly and easily installed within the duct. This should be evident from Fig. 2 where the bus 16 is shown as comprising three segments 43 which are mounted on alternate arms 31 of the spider 30. These segments can be of any suitable form, such as flat bars or bars of arcuate cross-section, but preferably they are of a channel-shaped cross-section with their flanges extending radially inward toward the center of the assembly, as shown in Fig. 2. Each of the bus segments is bolted in place on its corresponding arm 31 by means of a bolt 45 which extends through a suitable opening in the bus segment and into an appropriate threaded hole within the arm. At one of the insulator stations, each of the segments 43 is bolted rigidly to its spider 30, but at the other insulator station a slip joint is provided to permit each of the segments to expand and contract in response to temperature variations. This slip joint, a plan view of which is illustrated in Fig. 4, is provided by forming the opening which receives the bolt 45 as a slot 46 extending axially of the bus and by interposing a resilient washer 47 between the bolt head and the bus segment.

As will be apparent from Fig. 1, the bus segments extend axially beyond the ends of the main duct section so that the flexible connections 17 between axially adjacent bus sections are located within the split intermediate duct sections 14. The insulators 24 are located at the ends of the main duct section. Thus, by unclamping and removing the intermediate duct sections 14, the insulators and the flexible connections become readily accessible for inspection and repair.

An important advantage of my bus mounting arrangement is that the insulators 24 are cushioned against abruptly-applied mechanical shocks and are thus protected from the danger of being fractured by such shocks. This cushioning action is obtained by utilizing the thin-walled metallic duct as an integral part of the bus mounting arrangement and as a means for imparting resilience to the mounting arrangement. More particularly, instead of mounting the insulators directly in alignment with the foundation supports (20), as is conventional, I have located the insulators at stations which are widely offset from the foundation supports. Thus, an appreciable length of moderately resilient and yieldable metallic tubing is interposed between the insulators 24 and the foundation supports 20. As a result, suddenly-applied electromagnetic forces which tend to displace the bus 16 from its normal location are not abruptly transmitted to the rigid foundation supports 20 but are permitted to shift the bus slightly against the gradually increasing opposition of the resilient duct. This, of course, materially lessens the severity of the shocks which are applied to the porcelain insulators 24.

The above-described cushioning action is of particular importance under short circuit conditions, since such conditions can result in suddenly-established high electromagnetic forces tending to force the bus toward or away from adjacent buses. The cushioning action also protects the insulators from foundation shocks, such as caused by foundation settling or earth tremors.

It will be apparent that the above-described cushioning action which is provided by the thin-walled duct is useful in other types of bus mounting arrangements in addition to that shown. For example, it is also useful where simple pillar type insulators, not preloaded, are utilized for supporting the bus within the duct.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In electric bus duct apparatus, a tubular elongated duct section, a pair of groups of supporting insulators located at axially-spaced stations within said duct section, means for pivotally mounting each of said insulators on said duct section with the insulators of each group disposed in angularly-spaced, generally radially-extending relationship, axially-spaced frames pivotally connected to the radially inner ends of the insulators of each group, the insulators of each group being inclined with respect to a median plane perpendicular to the duct axis and forming oppositely-convex assemblies on opposite sides of said median plane, means for forcing said frames toward each other to precompress said insulators, an elongated conductive bus extending between said frames, and means supporting said bus on said frames.

2. In electric bus duct apparatus, a tubular elongated duct section, a pair of groups of supporting insulators located at axially-spaced stations within said duct section, means for pivotally mounting each of said insulators on said duct section with the insulators of each group disposed in angularly-spaced, generally radially-extending relationship, axially-spaced frames pivotally connected to the radially inner ends of the insulators of each group and holding the insulators of each group in axially-converging relationship, the insulators of one group converging in an axially opposite direction to the insulators of the other group, an elongated tension member extending between said frames, means adjustably mounted on said tension member and movable therealong for forcing said frames toward each other to precompress said insulators, an elongated conductive bus extending between said frames, and means supporting said bus on said frames.

3. In electric bus duct apparatus, a tubular elongated duct section, a pair of groups of supporting insulators located at axially-spaced stations within said duct section, means for pivotally mounting each of said insulators on said duct section with the insulators of each group disposed in angularly-spaced, generally radially-extending relationship, axially-spaced frames pivotally connected to the radially inner ends of the insulators of each group and holding the insulators of each group in axially-converging relationship, the insulators of one group converging in an axially opposite direction to the insulators of the other group, adjustable means extending between said frames for varying the distance between the frames to precompress said insulators, an elongated conductive bus extending between said frames, and means supporting said bus on said frames.

4. In electric bus duct apparatus, a tubular elongated duct section, a pair of groups of supporting insulators located at axially-spaced stations within said duct section, means for pivotally mounting each of said insulators on said duct section with the insulators of each group disposed in angularly-spaced, generally radially-extending relationship, axially-spaced frames pivotally connected to the radially inner ends of the insulators of each group and holding the insulators of each group in axially-converging relationship, the insulators of one group converging in an axially opposite direction to the insulators of the other group, adjustable means extending between said frames for varying the distance between the frames to precompress said insulators, an elongated conductive bus comprising a plurality of segments extending between said frames, and means supporting said segments on said frames in angularly-spaced relationship with respect to each other and with respect to said insulators.

5. In electric bus duct apparatus, a tubular elongated duct section having thin resilient walls, means extending over only a minor portion of the length of said duct section for supporting said duct section on a stationary foundation, a pair of groups of supporting insulators located at axially-spaced stations within said duct section, said insulator stations being located at regions which are widely offset in an axial direction from the location of said duct support means, means for pivotally mounting each of said insulators on said duct section with the insulators of each group disposed in angularly-spaced, generally radially-extending relationship, axially-spaced frames pivotally connected to the radially inner ends of the insulators of each group and holding the insulators of each group in axially-converging relationship, the insulators of one group converging in an axially opposite direction to the insulators of the other group, adjustable means for varying the distance between said frames to precompress said insulators, an elongated conductive bus extending between said frames, and means supporting said bus on said frames.

6. In electric bus duct apparatus, a tubular elongated duct section having thin resilient walls, means located near the midportion of said duct section for supporting said duct section on a stationary foundation, a pair of groups of supporting insulators located at axially-spaced stations within said duct section, said insulator stations being located at opposite ends of said duct section and widely offset in an axial direction from the location of said duct support means, means for pivotally mounting each of said insulators on said duct section with the insulators of each group disposed in angularly-spaced, generally radially-extending relationship, axially spaced frames pivotally connected to the radially inner ends of the insulators of each group and holding the insulators of each group in axially-converging relationship, the insulators of one group converging in an axially opposite direction to the insulators of the other group, means for forcing said frames in axially opposite directions with respect to each other to precompress said insulators, an elongated conductive bus extending between said frames, and means supporting said bus on said frames.

References Cited in the file of this patent

UNITED STATES PATENTS

| | | |
|---|---|---|
| 2,041,675 | Frank et al. | May 19, 1936 |
| 2,293,310 | Rudd | Aug. 18, 1942 |